(12) United States Patent
Bouquerel et al.

(10) Patent No.: US 6,872,800 B1
(45) Date of Patent: Mar. 29, 2005

(54) HYPERBRANCHED COPOLYAMIDE, COMPOSITION BASED ON SAID HYPERBRANCHED COPOLYAMIDE AND METHOD FOR OBTAINING SAME

(76) Inventors: Franck Bouquerel, 204, avenue Félix Faure, F-69003, Lyons (FR); Jean-Francois Sassi, 16, rue de 11 Novembre 1918, F-69390 Millery (FR)

( * ) Notice: Subject to any disclaimer, the term of this patent is extended or adjusted under 35 U.S.C. 154(b) by 0 days.

(21) Appl. No.: 09/959,710

(22) PCT Filed: May 5, 2000

(86) PCT No.: PCT/FR00/01229

§ 371 (c)(1),
(2), (4) Date: Jun. 18, 2002

(87) PCT Pub. No.: WO00/68298

PCT Pub. Date: Nov. 16, 2000

(30) Foreign Application Priority Data

May 5, 1999 (FR) ............................................. 99 05885

(51) Int. Cl.[7] ..................... C08G 69/02; C08G 69/08; C08G 63/00; C08G 73/10; C08G 69/26
(52) U.S. Cl. ..................... 528/310; 528/312; 528/322; 528/323; 528/324; 528/328; 528/335; 528/336; 528/342; 525/420
(58) Field of Search ............................. 528/170, 310, 528/322, 323, 332, 335, 336, 312, 324, 328, 342; 525/420, 432; 524/600, 602, 606

(56) References Cited

U.S. PATENT DOCUMENTS

| | | | | |
|---|---|---|---|---|
| 5,321,162 A | * | 6/1994 | Kim ............................ | 560/317 |
| 5,480,944 A | | 1/1996 | Aharoni | |
| 5,493,000 A | | 2/1996 | Aharoni | |
| 5,514,764 A | * | 5/1996 | Frechet et al. ................. | 528/10 |
| 5,587,446 A | * | 12/1996 | Frechet et al. ............... | 526/333 |
| 5,849,826 A | * | 12/1998 | Ogo et al. .................... | 524/410 |
| 6,300,424 B1 | * | 10/2001 | Frechet et al. ............... | 525/444 |
| 2003/0055209 A1 | * | 3/2003 | Wang ........................... | 528/310 |

FOREIGN PATENT DOCUMENTS

| | | |
|---|---|---|
| EP | 0996659 | 5/2000 |
| WO | WO 92/08749 | 5/1992 |
| WO | WO 93/09162 | 5/1993 |
| WO | WO 95/06080 | 3/1995 |
| WO | WO 95/06081 | 3/1995 |
| WO | WO 99/03909 | 1/1999 |

* cited by examiner

Primary Examiner—P. Hampton Hightower
(74) Attorney, Agent, or Firm—Burns, Doane, Swecker & Mathis, L.L.P.

(57) ABSTRACT

The invention relates to hyperbranched copolyamides (HBPAs), to their production and to their use as additives, in particular as melt viscosity modifiers in thermoplastic polymer compositions.

Figure 1:
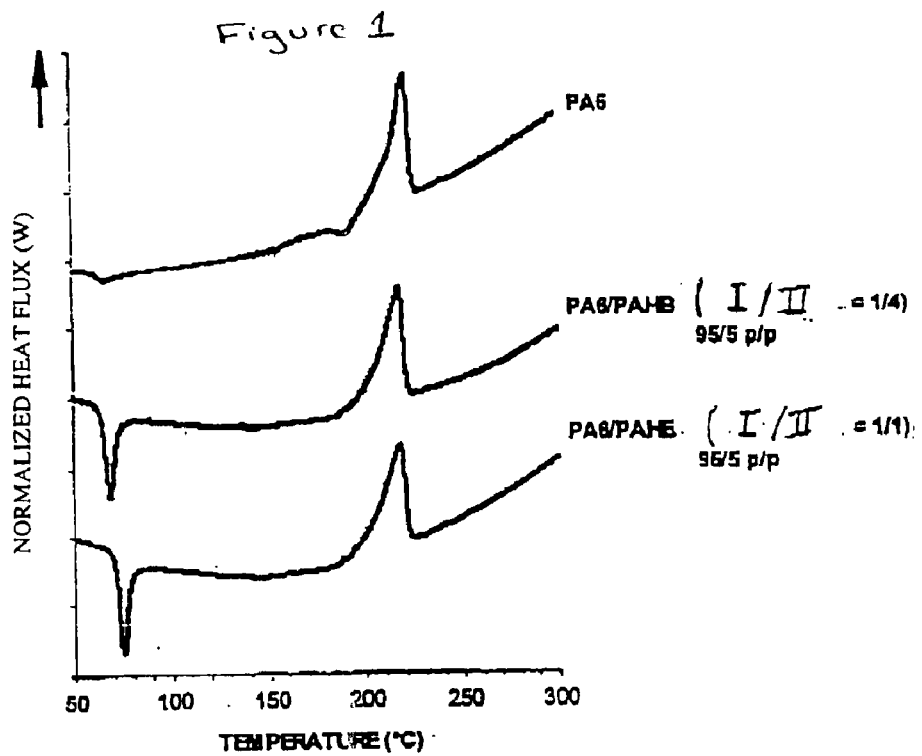

This copolyamide is obtained by a reaction between a monomer (I): $A—R—B_f$
with A and B=polymerization functions of a 1st and 2nd type, respectively, which are capable of reacting with each other, R=hydrocarbon-based species and f=total number of B per monomer (preferably $2 \leq f \leq 10$); and a monomer (II) $A'—R'—B'$ or the corresponding lactams, with A', B' and R' having the same definition as that given above for A, B and R, respectively. This HBPA has a I/II molar ratio such that $0.125 \leq I/II \leq 2$.

One of the species R or R' of (I) or (II) is aliphatic, cycloaliphatic or arylaliphatic.

For example: $A=NH_2$ and $B=COOH$ or $A=COOH$ and $B=NH_2$ with F=2.

$A'=NH_2$ and $B'=COOH$ or $A'=COOH$ and $B'=NH_2$.

$A—R—B_2$, e.g.: 5-aminoisophthalic acid or 3,5-diaminobenzoic acid and $A'—R'—B'=\epsilon$-caprolactam.

The yarns, fibres, films and moulded parts obtained using polymer compositions (e.g. PA) to which are added HBPA according to the invention are also included in this invention.

30 Claims, 2 Drawing Sheets

HYPERBRANCHED COPOLYAMIDE, COMPOSITION BASED ON SAID HYPERBRANCHED COPOLYAMIDE AND METHOD FOR OBTAINING SAME

The field of the invention is that of hyperbranched polymers, also known as dendritic polymers or fractal polymers, consisting of a three-dimensional network of multifunctional monomers which have reacted with each other, according to reactions, for example, of condensation of the amidation type.

The present invention relates to a hyperbranched copolyamide of the type obtained by reaction between, in particular, multifunctional monomers, for example trifunctional and difunctional monomers, each of the monomers bearing at least two different reactive polymerization functions.

The present invention is also directed towards the uses of these hyperbranched polymers, for example as fillers or additives in polymer compositions, these compositions constituting another subject of the present invention.

The invention also relates to a process for preparing such a hyperbranched polyamide and to compositions which may contain it.

Hyperbranched polymers generally have a substantially globular form ranging in size from a few nanometres to several tens of nanometres. These fractal polymers are of very low crystallinity, very low compressibility and show no shrinkage. Given their globular structure, they have a viscosity in the molten state which is lower than that of linear polymers of identical high molecular weight. It has been shown for certain fractal polymers that they have rheology-modifying abilities (melt viscosity) in polymer compositions comprising linear high molecular weight and high viscosity polymers.

Thus, the reference "Macromolecules, 25, 5561–5572 (1992)—Y. H. KIM AND O. W. WEBSTER" describes hyperbranched polyphenylenes synthesized from monomers of $AB_2$ type (e.g. 5-dibromophenylboronic acid and a Grignard reagent of 3,5-dihalophenyl type/Pd—Ni catalysis). KIM and WEBSTER also mention the reduction in the melt viscosity of polystyrenes, obtained by incorporating the abovementioned hyperbranched polyphenylenes.

In addition, the reference "Polymeric materials science and engineering PMSE, vol. 77, Meeting Sep. 8–11, 1997, American Chemical Society/KHADIR and GAUTHIER" discloses arborescent polymers consisting of hyperbranched macromolecules of dendritic structure. These hyperbranched polymers are obtained by reacting a partially chloromethylated linear polystyrene with polystyryl anions, so as to form a nucleus on which successive generations of arborescent polymers are grafted by various reactions and in particular by chloromethylation. The authors have demonstrated the fact that these arborescent polymers are melt rheology modifiers for linear polymers such as polystyrene and polymethyl methacrylate. In particular, these hyperbranched polymers allow a significant reduction or increase in the melt viscosity.

These hyperbranched polymers described as melt rheology modifiers are polyphenylenes and polystyrenes, which makes them usable only with linear polymers, provided that these linear polymers have polymerization functions that are chemically compatible with those of the abovementioned hyperbranched polymers. The result of this is that the latter polymers are not chemically compatible with, for example, polyamides and therefore cannot be used as rheology modifiers for the latter.

Hyperbranched polyamides (HBPA) are moreover known.

As illustrations of such polyamides of dendritic structure, mention may be made of PCT patent application WO 92/08749 which describes polymers of hyperbranched polyamide type and of hyperbranched polyester type obtained by a one-step polymerization process, involving a monomer of formula A—R—$B_2$. The hyperbranched polymers obtained are high molecular weight globular copolymers having a multiplicity of specific functional groups at their periphery. The polymerization-reactive functions A and B are borne by an aromatic species chosen from the group comprising phenyls, naphthyls, biphenyls, diphenyl ethers, diphenyl sulphones and benzophenone. The copolymers according to this PCT application are obtained by copolymerization of aromatic trifunctional monomers A—R—$B_2$ with, optionally, a difunctional monomer A—R—B. The polymerization-reactive functions AB considered are: OH, COOH, $NH_2$.

Patent application WO 97/26294 describes a hyperbranched polymer of the polyamide type, comprising multifunctional monomer units of $AQB_x$, type, x being greater than or equal to 2, Q representing a 1,3,5-triazine radical substituted with amines in positions 2,4,6, these amine groups bearing radicals comprising polymerization functions A and B which can be: $NH_2$, COOH.

PCT patent applications WO 93/09162, WO 95/06080 and WO 95/06081 disclose grafted or ungrafted, crosslinked or non-crosslinked fractal polymers which are or are not combined with linear polymers. The fractal polymers under consideration are copolyamides obtained, for example, by reaction of trifunctional monomers of $AB_2$ type (e.g. 5-aminoisophthalic acid AIPA), of difunctional monomers of AB type (e.g. para-aminobenzoic acid PAB) and of polyfunctional monomers of $B_3$ type (e.g. 1,3,5-benzenetricarboxylic acid) in smaller amounts relative to $AB_2$ and AB.

These three-dimensional polymers thus consist of aromatic repeating units having electrophilic or nucleophilic units on their exterior (polymerization-reactive functions A,B: COOH, $NH_2$). These PCT patent applications also describe starburst polymers consisting of a nucleus formed by the above mentioned fractal polymers, on the periphery of which are grafted linear polymer chains.

French patent application No. 2 766 197 also proposes a thermoplastic copolyamide of random tree type. This copolyamide results from the reaction:

between a multifunctional monomer containing at least 3 reactive functions A—R—$B_2$ ($NH_2$, COOH), e.g. 5-aminoisophthalic acid, 6-aminoundecanedioic acid, and difunctional monomers AB (e.g. ε-caprolactam) which are conventionally used for the manufacture of linear polyamides of PA-6 type. The ratio in molar % between the multifunctional monomers $AB_2$ and the difunctional monomers AB is: $0.01 \leq AB_2/AB \leq 5$.

Under these conditions, it is not possible for such polyamides of random tree type, added to a linear polyamide, to have an effect on the melt rheology of these linear polyamides. To achieve this result, the dendritic polyamides should be miscible with the linear polyamides at the molecular level. This amounts to saying that the HBPAs should not be solid but thermoplastic, at the melting point of the linear polyamides in which they are incorporated for the purposes of modifying the melt viscosity.

It must therefore be observed that the prior art provides no satisfactory solution to the problem which consists in providing hyperbranched polyamides that are, on the one hand, compatible with linear or branched polyamides, and, on the other hand, miscible, or at the very least dispersible at the molecular level, in molten linear or branched polyamides, so as to have available a HBPA which is capable of modifying the melt rheology of these linear or branched polyamides.

It may also be advantageous to enrich the family of dendritic polymers, with the aid of novel hyperbranched three-dimensional polyamide polymer structures, having properties that can be exploited in numerous applications.

One of the essential objects of the present invention is to overcome the deficiencies of the prior art by providing a novel hyperbranched copolyamide of the type obtained by reaction between:

at least one monomer of formula (I) below:

$$A\text{---}R\text{---}B_f \quad (I)$$

in which A is a polymerization-reactive function of a first type, B is a polymerization-reactive function of a second type capable of reacting with A, R is a hydrocarbon-based species which optionally comprises heteroatoms and f is the total number of reactive functions B per monomer: $f \geq 2$, preferably $2 \leq f \leq 10$;

and at least one difunctional monomer of formula (II) below:

$$A'\text{---}R'\text{---}B' \text{ or the corresponding lactams,} \quad (II)$$

in which A', B' and R' have the same definition as that given above for A, B and R, respectively, in formula (I);

characterized in that the I/II molar ratio is defined as follows:

$$0.05 < I/II$$

and preferably $0.125 \leq I/II \leq 2$;

and in that at least one of the species R or R' of at least one of the monomers (I) or (II) is aliphatic, cycloaliphatic or arylaliphatic.

These novel dendritic polymers—in particular hyperbranched polyamides HBPA—have an original structure, which results from the presence of a judiciously selected proportion of difunctional monomers A'—R'—B'.

The presence of a non-aromatic hydrocarbon-based skeleton bearing A, B or A', B' functions in the monomers (I) and (II), respectively, is a characteristic which makes it possible to obtain excellent properties for the hyperbranched polymers according to the invention.

In addition, these polymers also give an entirely satisfactory performance as functional fillers in polymer compositions. In particular, as regards hyperbranched polyamides (HBPAs), for example, it is observed that they are entirely compatible with and melt-dispersible in linear polyamides, in particular in PA-6, such that they can fully develop shear-thinning or shear-thickening properties. The hyperbranched polymers according to the invention, and in particular the HBPAs, also make it possible to improve the tensile mechanical properties (modulus of elasticity, elongation at break and breaking stress) of the polymers—for example polyamide—in which they are incorporated.

Moreover, these novel dendritic polymers have a retarding effect on the crystallization and thus the crystallinity of the polymer into which they are added as functional filler. This offers the possibility of obtaining transparent filled copolymers.

The hyperbranched polymers according to the invention also have an effect of increasing the glass transition temperature of the linear or branched polymers into which they are added.

Another advantage of these dendritic polyamide polymers relates to their simple and cost-effective method of production.

According to one preferential embodiment of the invention, the hyperbranched copolyamide is characterized in that:

the hydrocarbon-based species R and R' in the monomers (I) and (II), respectively, each comprise:
at least one linear or branched aliphatic radical;
ii and/or at least one cycloaliphatic radical;
iii and/or at least one aromatic radical comprising one or more aromatic nuclei;
it being possible for these radicals (i), (ii) and (iii) optionally to be substituted and/or to comprise heteroatoms;
A or A' is a reactive function of the amine or amine salt type or of the acid, ester, acid halide or amide type;
B or B' is a reactive function of the acid, ester, acid halide or amide type or of the amine or amine salt type.

Thus, the polymerization-reactive functions A, B, A' and B' which are more especially selected are those belonging to the group comprising carboxylic and amine functions.

For the purposes of the invention, the expression "carboxylic function" means any acid COOH, ester or anhydride function.

When A or A' corresponds to an amine or an amine salt, then B or B' represents an acid, an ester, an acid halide or an amide, and vice versa.

It should be noted that at and above a molar ratio (I)/(II)=0.5 molar, the hyperbranched polymer according to the invention begins to show shear-thinning properties. Without wishing to be bound by theory, this may be explained by the fact that below (I)/(II)=0.5, the structure has relatively little branching, whereas above (I)/(II)=0.5, the dendritic structure becomes a more pronounced globular structure.

According to one advantageous variant of the invention, the hyperbranched polymer can consist of a mixture of several different monomers (I) and several different monomers (II), provided that at least one of these monomers is aliphatic, cycloaliphatic or arylaliphatic.

Besides the multifunctional monomers (I) and the difunctional monomers (II), it may be envisaged to have a hyperbranched polymer according to the invention also comprising, as constituent elements, monofunctional or multifunctional monomers (III) of "core" type and/or monofunctional monomers (IV) of "chain-limiting" type.

The monomers of "core" type optionally included in the copolyamide and/or hyperbranched ester according to the invention can be those of formula (III) below:

$$R^1(B'')_n \quad (III)$$

in which:
°$R^1$ is a substituted or unsubstituted hydrocarbon-based radical such as silicone, linear or branched alkyl, aromatic, alkylaryl, arylalkyl or cycloaliphatic which can comprise unsaturations and/or heteroatoms;
°B" is a reactive function of the same nature as B or B';
°$n \geq 1$, preferably $1 \leq n \leq 100$.

The monomers of "chain-limiting" type optionally included in the hyperbranched copolyamide according to the invention can be those of formula (IV):

$$R^2\text{---}A'' \quad (IV)$$

in which:
°$R^2$ is a substituted or unsubstituted hydrocarbon-based radical such as silicone, linear or branched alkyl, aromatic, arylalkyl, alkylaryl or cycloaliphatic which can comprise one or more unsaturations and/or one or more heteroatoms;
°and A" is a reactive function of the same nature as A or A'.

According to one advantageous embodiment of the invention, at least some of the difunctional monomers (II) are in prepolymer form.

This may likewise be the case as regards the monomers (III) of "core" type or even the monomers (IV) of "chain-limiting" type.

The radicals $R^1$ and $R^2$ can advantageously comprise functionalities that give the hyperbranched polymer specific properties. These functionalities do not react with the functions A, B, A' or B' during the polymerization of the HBPA.

According to one preferred embodiment of the invention, f=2 such that the monomer (I) is trifunctional: $ARB_2$, A=amine function, B=carboxylic function and R=aromatic radical.

The hyperbranched polymer obtained according to the invention, from the monomers I and II, can be likened to arborescent structures which have a focal point formed by the function A and a periphery bearing end groups B. When they are present, the monomers (III) form cores. Advantageously, the hyperbranched polymer can comprise "chain-limiting" monofunctional monomers (IV) located at the periphery of the dendrimers according to the invention.

Moreover, the difunctional monomers (II) are spacer elements in the three-dimensional structure. They allow control of the branching density and are in particular the origin of the advantageous properties of the hyperbranched polymers according to the invention.

The monomers (III) and (IV) allow control of the molecular weight.

Advantageously, the monomer (I) is chosen, for example, from the group comprising:
5-aminoisophthalic acid,
6-aminoundecanedioic acid,
3-aminopimelic diacid,
aspartic acid,
3,5-diaminobenzoic acid,
3,4-diaminobenzoic acid,
lysine,
and mixtures thereof.

Advantageously and for example, the difunctional monomer of formula (II) is:
ϵ-caprolactam and/or the corresponding amino acid: aminocaproic acid,
and/or para- or meta-aminobenzoic acid,
and/or 11-aminoundecanoic acid,
and/or lauryllactam and/or the corresponding amino acid: 12-aminododecanoic acid.

More generally, difunctional monomers of formula (II) can be the monomers used for the manufacture of linear thermoplastic polyamides. Thus, mention may be made of ω-aminoalkanoic compounds comprising a hydrocarbon-based chain containing from 4 to 12 carbon atoms, or lactams derived from these amino acids, such as ϵ-caprolactam.

It is also possible to use several types of monomer (II) simultaneously. The use of several types of monomer (II) makes it possible to modify and control the glass transition temperature of the hyperbranched copolyamides and/or of the compositions having a matrix based on a thermoplastic polymer and the said hyperbranched copolyamide.

The preferred difunctional monomer (II) for implementing the invention is ϵ-caprolactam.

As examples, the monomers (III) may themselves be:
saturated aliphatic dicarboxylic acids containing from 6 to 36 carbon atoms, such as, for example, adipic acid, azelaic acid, sebacic acid or dodecanoic acid,
diprimary diamines, preferably linear or branched saturated aliphatic diamines having from 6 to 36 carbon atoms, such as, for example, hexamethylenediamine, trimethylhexamethylenediamine, tetramethylenediamine and n-xylenediamine,
polymer compounds such as amino-polyoxyalkylenes sold under the brand name JEFFAMINE®,
or else an amino-silicone chain, e.g. monoamino- or diamino-polydimethylsiloxane,
aromatic or aliphatic monoamines,
aromatic or aliphatic monoacids or
aromatic or aliphatic triamines or triacids.

The preferred "core" monomers (III) are hexamethylenediamine and adipic acid, JEFFAMINE® T403 sold by Huntsman, 1,3,5-benzenetricarboxylic acid and 2,2,6,6-tetra-(β-carboxyethyl)cyclohexanone.

According to another preferred characteristic of the invention, the molar ratio of the monomers (IV) to the difunctional monomers (I) is defined as follows:

$$\frac{(IV)}{(I)} \leq 10$$

preferably $$\frac{(IV)}{(I)} \leq 5$$

and more preferably still $$0 \leq \frac{(IV)}{(I)} \leq 2.$$

With regard to the molar ratio of the "core" functional monomers (III) to the multifunctional monomers (I), this may be defined as follows:

$$\frac{(III)}{(I)} \leq 1$$

preferably $$\frac{(III)}{(I)} \leq 1/2$$

and more preferably still $$0 \leq \frac{(III)}{(I)} \leq 1/3.$$

Advantageously, the hyperbranched copolyamide according to the invention can be in the form of particles each consisting of one or more arborescent structures. Another advantageous characteristic of such a copolyamide is the fact that it can be functionalized:
at the focal point of the arborescent structure(s), via monomers (III), optionally bearing the functionality or functionalities under consideration,
and/or at the periphery of the arborescent structures, via monomers (IV), optionally bearing the functionality or functionalities under consideration,
and/or optionally within the actual structure, the functionalities under consideration being borne via monomers (II).

As regards the synthesis aspect which forms an integral part of the present invention, it will be pointed out that the hyperbranched copolyamides according to the invention can be obtained by a process characterized in that it consists essentially in carrying out a polycondensation between monomers (I) and monomers (II) which react together and optionally with monomers (III) and/or (IV); this taking place under suitable temperature and pressure conditions.

This polymerization is performed in the melt, in solution or in the solid state, preferably in the melt or in solution; the monomer (II) advantageously acting as solvent.

The process for synthesizing the hyperbranched polymers of the invention can be implemented in the presence of at least one polycondensation catalyst and optionally at least one antioxidant compound. Such catalysts and antioxidant compounds are known to those skilled in the art. By way of example of catalysts, mention may be made of phosphorus compounds, such as phosphoric acid, phosphorous acid, hypophosphorous acid, phenylphosphonic acids, such as 2-(2'-pyridyl)ethylphosphonic acid and phosphites, such as tris(2,4-di-tert-butylphenyl)phosphite. As examples of antioxidants, mention may be made of doubly hindered phenolic-based antioxidants such as N,N'-hexamethylene-bis(3,5-di-tert-butyl-4-hydroxyhydrocinnamamide) and 5-tert-butyl-4-hydroxy-2-methylphenyl sulphide.

The polycondensation polymerization is carried out, for example, under conditions and according to a procedure which are equivalent to those used for the manufacture of the linear polyamide corresponding to the monomers (II).

One of the objects of the present invention is to produce functionalized compounds based on a hyperbranched copolyamide.

According to a first embodiment, the functionalities are obtained by using monomers carrying the desired chemical functions or groups. Mention may be made, for example, of ethoxylated or sulphonated functions or groups. The functions or groups are different functions or units of the amide functions and are carried by at least one of the monomers chosen from the monomers (I), (II), (III) or (IV). These compounds may be obtained by carrying out a polycondensation between monomers (I) with themselves and with monomers (II) which also react together and optionally with monomers (III) and/or (IV), at least one of the monomers carrying a chemical functionality different from the chemical functions reacting to form the amide linkages.

According to a second embodiment, the particular functionalities are obtained by treating a hyperbranched copolyamide after it has been synthesized. This may, for example, be the formation of a covalent or ionic bond or a complexing between a function carried at the end of a chain and a chemical compound. The chemical compound is thus linked to at least some of the terminal functions. It is thus possible to combine metal ions with the hyperbranched copolyamides, for example by cation exchange or complexing, or to modify the chain ends by chemical reactions. As an example, mention may be made of organic-based chemical compounds linked to the terminal functions by a covalent bond. Mention may also be made of compounds chosen from ions, metal ions and particles based on metals or metal oxide, these being linked to the terminal functions by ionic or chelating interaction.

By way of example, terminal amine functions, for example carried by monomers (II), may be made to react with epoxy groups, acrylic or methacrylic compounds or maleic anhydride.

The functionalization reactions according to the second embodiment of the invention may be carried out in the melt or in solution.

In practice, by way of example, a hydrophilic functionalization may be provided by polyoxyalkylene radicals coming from amino-polyoxyalkylenes of the JEFFAMINE® type. These functions are advantageously carried by the monomers (III) or (IV).

It is also possible to use monomers containing at least one sulphonate function, either at the ends of the molecular chains or within the molecular chains. By way of example of monomers, mention may be made of sulphobenzoic acid and the corresponding sodium sulphinate, sulphobenzylamines and the corresponding sodium sulphinate, and sulphoisophthalic acid or the corresponding sodium sulphinate.

The many advantageous properties of the hyperbranched copolyamides according to the invention open them up to a multitude of possible applications.

One of the applications is the use as melt rheology modifiers, for linear or branched polymers, for example polyamides. The polyamide is advantageously a polyamide of the type of those obtained by the polymerization of lactams, for example nylon-6.

Thus, the hyperbranched copolyamides according to the invention can have a shear-thickening or shear-thinning effect on thermoplastic polymer compositions. The result of this is that, according to a first use, a subject of the present invention is the use of hyperbranched copolyamides as defined above or as obtained by the process presented above, as a melt rheology modifier for linear or branched polymers, preferably polyamides.

According to one advantageous embodiment of the invention, the hyperbrached (co)polyamides are melt rheology modifiers, which are more specifically suitable for linear or branched polyamides.

The hyperbranched copolyamides according to the invention thus make it possible to adapt the melt flow index of the thermoplastic polymers to the constraints imposed by the various formation techniques used: injection moulding, injection-blow moulding, extrusion-blow moulding, spinning, manufacture of films, extrusion.

Without this being limiting, outlets for the shear-modifying hyperbranched polymers according to the invention which may be mentioned are the industries of fibre, yarn and film manufacture, for example, by extrusion and moulded parts.

Another of the important applications of the hyperbranched copolyamides according to the invention is linked to their ability to modify the thermomechanical properties of polymers, and in particular of thermoplastic polymers such as, for example, polyamides or polyesters.

It is found, in fact, that, when incorporated into the thermoplastic polymers, the HBPAs according to the invention have the effect of slowing down the crystallization kinetics of the thermoplastic polymers. This slowing down may be such that it makes it possible to obtain an amorphous product which may be again rendered crystallizable by a heat treatment. This halting of crystallization is reflected by a reduction in crystallinity, and thus an increase in transparency, of the thermoplastic polymer obtained.

Another effect observed for the hyperbranched copolyamides according to the invention when they are incorporated into thermoplastic polymers is an increase in the glass transition temperature.

As a result of this, a second use of the branched copolyamides as defined above and/or obtained by the process also presented above is that of an agent for modifying the thermomechanical properties of polymer materials preferably comprising polyamides and/or polyesters.

These properties of the HBPAs according to the invention can be exploited for the adaptation of thermoplastic polymers to the various formation techniques: injection moulding, injection blow-moulding, extrusion blow-moulding, formation of films, extrusion, spinning.

In particular, this exploitation may be convenient for the manufacture of fibres, yarns or films made of thermoplastic polymers, for example polyamides and/or polyesters.

In the context of other uses of the hyperbranched copolyamides according to the invention, they are envisaged in a functionalized form. These functionalized HBPAs have been described above.

The functionalities which can be supported by the HBPAs according to the invention are, for example, fluoro radicals, fatty chains, silicone radicals, radicals with anti-UV, antioxidant, surfactant, softening, anti-soiling, stabilizing, hydrophobic and/or hydrophilic properties, or radicals with properties of encapsulation and/or vectorization of active principles, for example of agrochemical nature or dyes and/or pigments.

As a result of this, the invention also relates to the use of the hyperbranched and functionalized copolyamide as defined above and/or obtained by the process presented above, as an additive in materials. In particular, it can be used as an additive for modifying the hydrophilicity/hydrophobicity of polymer materials comprising, for example, polyamides and/or polyesters.

The invention relates in particular to the use of the hyperbranched copolyamide as an additive blended with a thermoplastic, preferably a polyester or a polyamide, more preferably still a nylon-6, so as to improve the hydrophilicity and/or the antistatic behaviour of yarns, fibres or filaments melt-spun from the blend. This constitutes a third particular use.

The fourth use of the hyperbranched copolyamides according to the invention stems from the possibility which exists of functionalizing these hyperbranched polymers, for example at the "core" and/or at the "periphery", with specific functions other than A, B, A' and B'. Specifically, it has been found that the judiciously functionalized hyperbranched polymers according to the invention have a power for stabilizing dispersions, preferably aqueous dispersions, of organic and inorganic products. These may be in particular dispersions of pigments such as $TiO_2$. In order to be able to fulfil this function, it is important for the hyperbranched copolyamides according to the invention to be functionalized such that they are soluble or dispersible in the liquid medium of the dispersion and in particular in water as regards aqueous dispersions.

The use of the HBPAs according to the invention for the stabilization of pigments of $TiO_2$ type will be particularly appreciated in the field of paints formed by aqueous dispersions of such pigments.

As a result of this, the invention also relates to the use of the functionalized hyperbranched copolyamide as defined above as a stabilizer for a dispersion, preferably an aqueous dispersion, of inorganic and/or organic products.

Within the context of a fifth use, the hyperbranched copolyamides according to the invention, optionally functionalized, are used as an additive in thermoplastic matrices, preferably in order to form yarns, fibres or filaments, so as to modify their properties with respect to dyes and pigments. For this purpose, it is preferred to use hyperbranched copolyamides whose terminal functions are functions of amine type. Terminal functions of amine type carried by aliphatic radicals are most particularly preferred. Such compounds may be obtained by using an amino acid, preferably an aliphatic amino acid, as monomer (II), and a monomer (I) comprising an amine function and two acid functions. The yarns, fibres and filaments based on polyester or polyamide, and comprising a hyperbranched copolyamide as described above, exhibit, for example, an improved dyeing affinity and an improved dye fastness on washing. For these applications, mention may more particualrly be made of bath dyeing processes, using acid dyes.

It has been observed that the hyperbranched copolyamides of the invention, when they are used as additives with a polyamide-based matrix, had a tendency to migrate to the surface of the said matrix. The concentration of hyperbranched copolyamide is greater at the surface than at the core of the formed material.

A sixth use consists in using the hyperbranched copolyamides as surface modifiers for thermoplastics, preferably polyesters or polyamides. The compositions comprising the matrix and the additives based on hyperbranched copolyamides may be formed from granules by extrusion, blow-moulding, injection moulding, gas injection moulding or other moulding processes. The articles thus obtained may exhibit superior paintability, particularly high metallizability or an interface allowing them to be compatibilized with an external medium.

According to another subject, the invention is directed towards polymer-based compositions comprising at least:

a polymer matrix;

and at least one additive comprising at least one hyperbranched copolyamide as defined above and/or as obtained by the process as defined above.

The polymer matrix may be chosen from thermoplastic elastomers and polymers. Advantageously, a polyamide-based matrix is used, for example nylon-6 or nylon-6,6. The compositions may in addition include fillers such as silica particles, glass fibres and mineral fillers, for example a matting agent such as titanium dioxide.

Advantageously, the concentration of this additive relative to the total mass of the composition is between 0.001 and 70%, preferably between 0.001 and 50% and more preferably between 0.001 and 30%.

According to one advantageous embodiment, the additive in the abovementioned thermoplastic polymer composition comprises functionalized HBPA as defined above.

Finally, a dispersion or a solution, preferably an aqueous one, which is to be placed in relation with the fourth use of the HBPAs according to the invention and which is characterized in that it comprises:

a liquid dispersion or solubilization medium, which is preferably aqueous;

at least one dispersed organic and/or inorganic product;

and at least one stabilizer comprising at least one functionalized hyperbranched polyamide as defined above, is also included in the invention.

Conventionally, the abovementioned polymer compositions to which are added the HBPAs according to the invention can also comprise other ingredients chosen from the group comprising reinforcing fillers, bulking fillers, antioxidants, stabilizers (heat/light stabilizers), pigments, dyes, flame retardants, moulding or demoulding additives and surfactants.

According to another characteristic of the invention, the abovementioned compositions are obtained by the mixing, for example in a single-screw or twin-screw extruder, of a linear or branched polymer, preferably thermoplastic—for example polyamide—matrix and of an HBPA according to the invention optionally completed with other conventional additives. This mixing is generally carried out in the melt. According to one common embodiment, this mixture is extruded in the form of rods which are then chopped up and granulated. The moulded parts are then prepared by melting the granules produced above and feeding the molten composition into suitable moulding, injection-moulding, extrusion or spinning devices.

In the case of the manufacture of yarns, fibres and filaments, the composition obtained at the extruder outlet optionally directly feeds a spinning plant.

Preferably, a composition is thus prepared comprising linear polyamide as matrix and an additive (0.01 to 70% as dry weight) consisting of the hyperbranched polyamide according to the invention.

The final subject of the present invention consists of the articles obtained by formation, preferably by moulding, injection-moulding, injection/blow-moulding, extrusion, extrusion/blow-moulding or spinning, of one of the HBPA-added polymer compositions as defined above. In a more especially preferred manner, these articles consist of yarns, fibres, films or blown or moulded parts.

The hyperbranched polymers according to the invention are also advantageous in that they can be used as adhesion promoters, fixing or encapsulating agents for active principles (agrochemistry), compatibilizers for mixing several polymers, supports for crosslinking, detergency, softening, anti-soiling (hydrophobicity/hydrophilicity), anti-corrosion or lubricant functionalities.

Other details and advantages of the invention will emerge more clearly in the light of the examples below, given purely for the purpose of illustration.

EXAMPLES

Example 1

Synthesis of a Hyperbranched Copolyamide Containing Carboxylic Acid End Groups by Molten-Phase Copolycondensation of 1,3,5-Benzenetricarboxylic Acid (Core Molecule of $R^1$—$B"_3$ Type, with $B"$=COOH), of 5-Aminoisophthalic Acid (Branching Molecule of A—R—$B_2$ Type, with A=$NH_2$ and B=COOH) and of ε-Caprolactam (Spacer of A'—R'—B' Type, with A'=$NH_2$ and B'=COOH)

The reaction is carried out at atmospheric pressure in a 7.5 l autoclave commonly used for the melt synthesis of polyesters or polyamides.

The monomers are loaded completely at the start of the test. 1811.5 g of 5-aminoisophthalic acid (10 mol), 84 g of 1,3,5-benzenetricarboxylic acid (0.4 mol), 1131.6 g of ε-caprolactam (10 mol) and 1.35 g of an aqueous 50% (w/w) solution of hypophosphorous acid are successively introduced into the reactor. The reactor is purged by a succession of 4 sequences of creating a vacuum and of re-establishing atmospheric pressure using dry nitrogen.

The reaction mass is heated gradually from 20 to 200° C. over 100 min, then from 200 to 245° C. over 60 min. When the temperature of the mass reaches 100° C., stirring is started with a rotation speed of 50 revolutions per minute. The distillation begins at a bulk temperature of 160° C. and continues up to a temperature of 243° C. At 245° C., the stirring is stopped and the reactor is placed in an overpressure of nitrogen. Next, the bottom valve is gradually opened and the polymer is run into a water-filled stainless steel container.

The water contained in the 221.06 g of distillate collected is titrated using a Karl Fischer coulometer. The water content in the distillate is 81.1%, which reflects an overall degree of progress of 99.3%.

The hyperbranched copolyamide obtained is soluble at room temperature in the amount of aqueous sodium hydroxide required to neutralize the terminal acid functions.

Example 2

Synthesis of a Hyperbranched Copolyamide Containing Carboxylic Acid and Polyalkylene Oxide Mixed End Groups, by Molten-Phase Copolycondensation of 5-Aminoisophthalic Acid (Branching Molecule of A—R—$B_2$ Type, with A=$NH_2$ and B=COOH), of ε-Caprolactam (Spacer of A'—R'—B' Type, with A'=$NH_2$ and B'=COOH) and of Jeffamine M 1000 (Polyoxyethylene-Co-Oxypropylene Amine, Chain-Stopping Molecule of $R^2$—A" Type, with A"=$NH_2$)

The assembly and the procedure used are essentially identical to those described in Example 1.

2470.6 g of Jeffamine M 1000 (2.1 mol); 543.45 g of 5-aminoisophthalic acid (3 mol); 339.5 g (3 mol) of ε-caprolactam and 0.53 g of an aqueous 50% (w/w) hypophosphorous acid solution are successively loaded into the autoclave. The reactor is purged by a succession of 4 sequences of creating a vacuum and of re-establishing atmospheric pressure using dry nitrogen.

Compared with Example 1, the stirring speed is raised to 100 rpm and the temperature at the end of the polycondensation is 260° C. The polymer is expelled via the base valve alter cooling to 120° C.

The polymer obtained is soluble in water.

Example 3

Synthesis of a Hyperbranched Copolyamide Containing Amino End Groups by Melt Copolycondensation of Jeffamine® T 403 (Core Molecule of $R^1$—$B"_3$ type, with $B"$=$NH_2$), of 3,5-Diaminobenzoic Acid (Branching Molecule of A—R—$B_2$ Type, with A=COOH and B=$NH_2$) and ε-Caprolactam (Spacer of A'—R'—B' Type with B'=$NH_2$ and A'=COOH)

The reaction is carried out at atmospheric pressure and under a gentle flush of nitrogen in a 1 l autoclave commonly-used for the melt synthesis of polyesters or polyamides.

The monomers are loaded completely at the start of the test. 322.5 g of 3,5-diaminobenzoic acid (2.12 mol), 239.9 g of ε-caprolactam (2.12 mol), 37.3 g of Jeffamine® T 403 (0.085 mol), 4 g of 5-tert-butyl-4-hydroxy-2-methylphenyl sulphide (Ultranox® 236) and 1.1 ml of an aqueous 50% (w/w) solution of hypophosphorous acid are successively introduced into the reactor. The reactor is purged by a succession of 4 sequences of creating a vacuum and of re-establishing atmospheric pressure using dry nitrogen.

The reaction mass is heated gradually from 20 to 200° C. over 100 min, then from 200 to 230° C. over 60 min and finally held at 230° C. for 180 min. When the bulk temperature reaches 100° C., the stirring is started with a rotation speed of 50 revolutions per minute. The distillation starts at a bulk temperature of 215° C. After 180 min at 230° C., the stirring is stopped and the reactor is placed in an overpressure of nitrogen. Next, the bottom valve is gradually opened and the polymer is run into a water-filled stainless steel container.

Example 4

Synthesis of a Hyperbranched Copolyamide Containing Amine End Groups by the Melt Copolycondensation of L-Lysine (Branching Molecule of A—R—$B_2$ Type with A=COOH and B=$NH_2$) and ε-Caprolactam (Spacer of A'—R'—B' Type with B'=$NH_2$ and A'=COOH)

The assembly and the procedure used are essentially identical to those described in Example 1.

337.7 g (2.31 mol) of L-lysine; 261.4 g (2.31 mol) of ε-caprolactam; 0.83 g of 5-tert-butyl-4-hydroxy-2-methylphenyl sulphide (Ultranox® 236) and 600 l of an aqueous 50% (w/w) solution of hypophosphorous acid are successively loaded into the autoclave. The reactor is purged by a succession of 4 sequences of creating a vacuum and of re-establishing atmospheric pressure using dry nitrogen.

The reaction mass is gradually heated from 20 to 120° C. over 100 min, then from 120 to 200° C. over 100 min and finally held at 200° C. for 60 min. When the bulk temperature reaches 80° C., the stirring is started with a rotation speed of 50 revolutions per minute. The distillation starts at a bulk temperature of 160° C. After 60 min at 200° C., the stirring is stopped and the reactor is placed under an overpressure of nitrogen. Next, the bottom valve is gradually opened and the reactor is drained.

Example 5

Synthesis of a Hyperbranched Copolyamide Containing Carboxylic Acid End Groups by the Melt Copolycondensation of 1,3,5-Benzenetricarboxylic Acid (Core Molecule of R'—$B"_3$ Type, with $B"$=COOH), 5-Aminoisophthalic Acid (Branching Molecule of A—R—$B_2$ Type, with A=$NH_2$ and B=COOH), ε-Caprolactam and M-Aminobenzoic Acid (Spacers of A'—R"—B' Type with A'=$NH_2$ and B'=COOH)

The assembly and the procedure used are essentially identical to those described in Example 3.

The monomers are loaded completely at the start of the test. 130.4 g of 5-aminoisophthalic acid (0.72 mol); 9.2 g (0.044 mol) of 1,3,5-benzenetricarboxylic acid; 163 g (1.44 mol) of ε-caprolactam; 197.5 g (1.44 mol) of m-aminobenzoic acid and 190 l of an aqueous 50% (w/w) solution of hypophosphorous acid are successively introduced into the reactor. The reactor is purged by a succession of 4 sequences of creating a vacuum and of re-establishing atmospheric pressure using dry nitrogen.

The reaction mass is heated gradually from 20 to 200° C. over 100 min, then from 200 to 242° C. over 60 min and finally held at 242° C. for 10 min. When the bulk temperature reaches 90° C., the stirring is started with a rotation speed of 50 revolutions per minute. The distillation starts at a bulk temperature of 208° C. After 10 min at 242° C., the stirring is stopped and the reactor is placed under an overpressure of nitrogen. Next, the bottom valve is gradually opened and the polymer is run into a water-filled stainless steel container.

Example 6

Synthesis of a Hyperbranched Copolyamide Containing Amine End Groups and Having a Polyoxyalkylene Focal Functionality by the Melt Copolycondensation of Jeffamines ® M 1000 (Chain-Stopping Molecule of $R^2$—A" Type with A"=$NH_2$), 3,5-Diaminobenzoic-Acid (Branching Molecule of A—R—$B_2$ Type, with A=COOH and B=$NH_2$) and ε-Caprolactam (Spacer of A'—R"—B' type with B'=$NH_2$ and A'—COOH)

The reaction is carried out at atmospheric pressure and under a gentle flush of nitrogen in a laboratory system consisting of a 300 ml bottom glass reactor heated by means of a bath of Wood's alloy and a 100 ml jacketed top reactor heated by oil circulation.

96.85 g (0.087 mol) of Jeffamine® M 1000; 0.13 g of 5-tert-butyl-4-hydroxy-2-methylphenyl sulphide (Ultranox® 236) and 170 l of an aqueous 50% (w/w) solution of hypophosphorous acid are loaded into the bottom reactor.

48.76 g (0.32 mol) of 3,5-diaminobenzoic acid and 54.39 g (0.48 mol) of ε-caprolactam are loaded into the top reactor.

The complete system is purged by a succession of 4 sequences of creating a vacuum and of re-establishing atmospheric pressure using dry nitrogen.

The bottom reactor is heated at 230° C. and placed under stirring (speed=150 rpm). The top reactor is heated to 120° C. and placed under stirring (speed=50 rpm). The 3,5-diaminobenzoic acid is then dissolved in the ε-caprolactam melt. This solution is run under gravity into the bottom reactor over a period of 5 hours. The distillation takes place concomitantly. Once running has been completed, the bottom reactor is held with stirring at 230° C. for 1 h 30 min. The reaction mass is then cooled and the polymer recovered by opening the assembly.

Example 7

Synthesis of a Hyperbranched Copolyamide Containing Maleimide End Groups by the Reaction of Maleic Anhydride on a Hyperbranched Copolyamide Containing Amine End Groups The reaction is carried out under nitrogen in a three-necked round-bottomed flask fitted with a dropping funnel, a condenser and a mechanical stirrer.

7.84 g of maleic anhydride are dissolved in 40 ml of N,N-dimethylformamide and introduced into the dropping funnel. 10 g of hyperbranched copolyamide containing amine end groups, as described in Example 3, are dissolved in 90 ml of N,N-dimethylformamide. The contents of the dropping funnel are added at room temperature over a period of 60 min. The reaction mass is then held with stirring at room temperature for 4 hours. Next, 24 ml of acetic anhydride and 2.1 g of sodium acetate are added and the flask is heated to 90° C. After 30 min at 90° C., the reaction mass gels. The heating is maintained for 120 additional minutes and then the contents of the flask are poured out over crushed ice. A brown solid is isolated by filtration, washed with a solution of 5% w/w sodium bicarbonate, then with water and then with methanol. The final product is dried at 60° C. under the vacuum created by a vane pump.

Characterization using Fourier transform infrared spectrophotometry shows the presence of characteristic imide bands and the disappearance of the amine bands exhibited initially by the hyperbranched copolyamide before modification.

Example 8

Synthesis of a Hyperbranched Copolyamide Containing Quaternary Ammonium End Groups and Having a Polyoxyalkylene Focal Functionality by Modification of the Ends of a Hyperbranched Copolyamide Containing Amine End Groups and Having a Polyoxyalkylene Focal Functionality The reaction is carried out under nitrogen in a laboratory glass reactor fitted with a mechanical stirrer.

32.39 g of an aqueous 70% (w/w) solution of epoxypropyltrimethylammonium chloride (QUAB® 151), 30 g of hyperbranched copolyamide as described in Example 6 and 20 ml of demineralized water are introduced into the reactor. The mixture is placed under stirring and heated at 70° C. for 24 Hours.

The reaction mass is then diluted with 30 ml of demineralized water and transferred into a decanting funnel. 4 liquid/liquid extractions are made with fractions of 50 ml of ethyl ether. The aqueous phase is transvased into a round-bottomed flask and vacuum-dried in the rotary evaporator.

Example 9

Effect of the A—R—$B_2$/A'—R'—B' Ratio and of the Nature of the End Groups on the Properties of the Hyperbranched Polyamides Various hyperbranched polyamides are synthesized according to the protocols described in Examples 1 and 3. In all cases, the monomer A'—R'—B' is ε-caprolactam.

The glass transition temperatures are measured by differential calorimetry.

The evaluation of the solubility is performed at 10% (w/w) in the solvent chosen.

The results are collated in Table I below.

TABLE I

| A—R'—B$_2$/ A—R"—B (mol/mol) | COOH end groups A—R—B$_2$ = 5-aminoisophthalic acid | | NH$_2$ end groups A—R—B$_2$ = 3,5-diaminobenzoic acid | |
|---|---|---|---|---|
| | Tg | Solvents | Tg | Solvents |
| 1/1 | 183.7° C. | DMAc, NMP, NaOH 1N | 154.9° C. | DMAc, NMP, HCl 1N |
| 1/2 | 116° C. | DMAc, NMP, NaOH 1N | nd | nd |
| 1/3 | 96.5° C. | DMAc, NMP | nd | nd |
| 1/4 | 81.2° C. | DMAc + 5% LiCl (w/w) | 82.4° C. | DMAc + 5% LiCl (w/w) |

Abbreviations: DMAc = N,N-dimethylacetamide; NMP = N-methylpyrrolidone; nd = not determined

Example 10
Preparation of Blends of Hyperbranched Copolyamide (A—R—$B_2$/A'—R'—B'=1/1)+Poly($\epsilon$-Caprolactam) (PA-6)+Glass Fibres The hyperbranched copolyamide of Example 1 (referred to as HBPA®) is ground coarsely and premixed in the desired proportions with poly($\epsilon$-caprolactam) (PA-6) granules. Compositions containing 50% by weight of glass fibres and a PA-6 matrix to which variable amounts of hyperbranched copolyamide are added are produced by melt blending at a temperature of 250° C. in a twin-screw extruder.

The properties of these compositions are collated in Table II below.

TABLE II

| Matrix | Notched Izod impact strength (kJ/m²) | Tensile modulus (N/mm²) | Breaking stress (N/mm²) | MFI (1) 275° C. 325 g (g/10 min) | Spiral test (2) (cm) |
|---|---|---|---|---|---|
| PA-6 | 18.8 | 14335 | 217.2 | 1.3 | 26.5 |
| PA-6/HBPA ® 95/5 (w/w) | 16.1 | 13361 | 221.5 | 2.2 | 41 |
| PA-6/HBPA ® 90/10 (w/w) | 14.8 | 14624 | 240.4 | 5.7 | 39 |
| PA-6/HBPA ® 80/20 (w/w) | 15.2 | nd | nd | 13.6 | 62.3 |

(1) Melt flow index (MFI) determined according to ASTM standard D1238.
(2) This test consists in injecting the composition into a spiral-shaped mould 1 mm thick and 40 mm wide under a 180 tonne Battenfeld press at a temperature of 270° C., a mould temperature of 80° C. and an injection pressure of 80 kg/cm². The injection time is 1.5 seconds. The result is expressed as the length of mould correctly filled by the composition.

These results clearly show that for compositions in which the hyperbranched copolyamide HBPA® is added, the melt flow index increases considerably without substantially altering the mechanical properties.

Example 11
Preparation of Blends of Hyperbranched Copolyamide+Poly($\epsilon$-Caprolactam) (PA-6) by Varying the A—R—$B_2$/A'—R'—B' Ratio of the Hyperbranched Copolyamide The mixing conditions are identical to those of Example 10. The compositions are free of glass fibres.

The hyperbranched copolyamides under consideration in this case differ in their A—R—$B_2$/A'—R'—B' ratio. They are both obtained from 5-aminoisophthalic acid, 1,3,5-benzenetricarboxylic acid and $\epsilon$-caprolactam according to a protocol similar to that of Example 1.

The melt viscosity of the blends is measured using a Gottfert 2002 capillary rheometer: a piston moving at variable speed pushes the molten product at a temperature of 260° C. through a capillary of length L=30 mm and of radius R=1 mm. The corresponding flow rate is noted as Q. The pressure P at the capillary inlet is measured. The relationships for calculating the apparent viscosity are:

apparent stress on the wall: $\tau_a = RP/2L$ apparent shear rate at the wall: $\gamma_a = 4Q/\pi^3$ apparent viscosity at the wall: $\eta_a = \tau_a/\gamma_a$ The samples are dried for 16 hours at 110° C. under a vacuum of 0.1 mbar before evaluation. The melting time for the polymer before measurement is 5 min. The measurement is carried out under an argon atmosphere.

The results of the capillary rheometry measurements for a shear rate of 50 s⁻¹ are collated in Table III below.

TABLE III

| Composition | Apparent viscosity at 50 s⁻¹ (in Pa · s) |
|---|---|
| PA-6 | 290 |
| PA-6/HBPA (A—R—$B_2$/A'—R'—B' = 1/1) 90/10 (w/w) | 97 |
| PA-6/HBPA (A—R—$B_2$/A'—R'—B' = 1/4) 90/10 (w/w) | 409 |

These results clearly show that the hyperbranched copolyamide can have a shear-thinning effect or, in contrast, a shear-thickening effect on the composition according to the A—R—$B_2$/A—R'—B ratio.

Example 12
Study of the Thermomechanical Behaviour of Hyperbranched Copolyamide+PA-6 Blends The compositions of Example 11 are injected in the form of rectangular bars. These test pieces are dried for 16 hours at 110° C. under a vacuum of 0.1 mbar before evaluation. The study of the thermomechanical behaviour of the materials is carried out on a Rheometrics RMS 800 machine in rectangular torsion, over the temperature range [−100° C.; +200° C.].

The results are collated in Table IV below.

TABLE IV

| Composition | Elastic modulus at 23° C. (MPa) | Glass transition temperature (° C.) |
|---|---|---|
| PA-6 | 1004 | 69.1 |
| PA-6/HBPA (A—R—$B_2$/A'—R'—B' = 1/1) 90/10 (w/w) | 1038 | 87.1 |
| PA-6/HBPA (A—R—$B_2$/A'—R'—B' = 1/4) 90/10 (w/w) | 1004 | 73.4 |

These results show that the addition of hyperbranched copolyamide clearly increases the glass transition temperature of the PA-6 matrix.

Example 13
Effect of the Introduction of Hyperbranched Copolyamide on the Crystallization of PA-6

Blends similar to those of Example 11, but containing 5% by weight of hyperbranched copolyamide, are studied by differential calorimetry using a Perkin Elmer DSC Pyris 1 machine. The analysis protocol is as follows:

step 1: heat from 30° C. to 310° C. at 10° C./min, step 2: steady stage at 310° C. for 5 min, step 3: removal of the sample from the calorimetry oven and immediate immersion into liquid nitrogen, step 4: stabilization of the oven at 30° C., step 5: reinsertion of the capsule and raising of the temperature again from 30 to 310° C. at 10° C./min.

The various parameters measured in step 5 are collated in Table V below and the compared thermograms recorded between 50 and 300° C. in step 5 are given in FIG. 1.

TABLE V

| Composition | Crystallization temperature (° C.) | Enthalpy of crystallization (J/g) | Melting point (° C.) | Enthalpy of fusion (J/g) |
|---|---|---|---|---|
| PA-6 | 66.2 | −7.5 | 221.8 | 68.2 |
| PA-6/HBPA (A—R—B$_2$/ A'—R'—B' = 1/1) 95/5 (w/w) | 74.5 | −28.9 | 218.0 | 61.1 |
| PA-6/HBPA (A—R—B$_2$/ A'—R'—B' = 1/4) 95/5 (w/w) | 70.3 | −28.5 | 219.3 | 61.1 |

The PA-6 control sample shows a very small crystallization peak when the temperature is raised again. It has had the time to crystallize almost completely despite the rapid cooling in liquid nitrogen. On the other hand, the products containing hyperbranched copolyamide both give a large crystallization peak, which represents, in terms of area, half of the melting peak. Their degree of crystallinity after tempering is thus considerably reduced relative to that of the control sample.

These results show that the hyperbranched copolyamide acts as a crystallization retardant for the PA-6 matrix. The hyperbranched additive thus makes it possible to obtain PA-6 matrices that are only slightly crystallized, the crystallinity of which can be regenerated by heating. The reduction in crystallinity is reflected by a greater transparency of the moulded parts or of the yarns extruded from compositions containing the hyperbranched copolyamide.

Example 14
Surface Segregation of the Hyperbranched Copolyamides in the Hyperbranched Copolyamide+Poly(ε-Caprolactam) (PA-6) Blends The composition of Example 11 containing 10% w/w of the hyperbranched copolyamide from Example 1 and 90% w/w of PA-6 is injection-moulded in the form of dumbbell specimens. Approximately 10 μm thick cross sections of these specimens are produced using an ultramicrotome and observed using an optical microscope with UV excitation and a blue cut-off filter. It is observed that the entire section of the specimen is fluorescent, with a more intense region at the edge, over a thickness of about 25 μm (see Figure V).

This observation shows that the concentration of hyperbranched polymer is higher at the surface of the specimen than at the core. Under the forming conditions, the hyperbranched additive initially blended homogeneously with the PA-6 matrix therefore has a tendency to migrate to the surface of the specimen.

Example 15
Preparation and Evaluation of Yarns from Polymer Compositions Comprising a Polyamide (PA-6) Matrix and HBPA According to the Invention as Additive 15.A. Compositions Used (i) Comparative tests 15.1 and 15.2

| Test | Matrix | Viscosity index VI | HBPA |
|---|---|---|---|
| 15.1 | PA-6 | 130 | Example 9 with (I)/(II) = 1/1 |
| 15.2 | PA-6 | 150 | Example 9 with (I)/(II) = 1/1 |

The PA-6 matrix is a polymer sold by the company Nyltech under the name Sniamid 130CP®.

(ii) Tests 15.3 to 15.6 with compositions comprising 95 or 98% by weight of a PA-6 matrix, whose VI=150, sold by the company Nyltech under the reference Sniamid 150CP® and 5 or 2% by weight of the HBPAs of Example 9 with (I)/(II)=1/1.

| Test | [HBPA] (%) | End group | (I)/(II) |
|---|---|---|---|
| 15.3 | 2 | COOH | 1/1 |
| 15.4 | 2 | NH$_2$ | 1/1 |
| 15.5 | 5 | COOH | 1/1 |
| 15.6 | 5 | NH$_2$ | 1/1 |

15.B Manufacture of Non-Drawn Yarns Using These Compositions

The non-drawn yarns were obtained by low-speed melt spinning and air-cooling. In the melting zone, the spinning temperature is between 235° C. and 245° C.

No significant difference in spinning behaviour is revealed between the comparative compositions 15.1 and 15.2 and those containing an HBPA (15.3 to 15.6).

After spinning, reels of non-drawn monofilament of diameter 250 μm are obtained.

15.C Manufacture of Drawn Yarns Using the Non-Drawn Yarns 15.1 to 15.6 Obtained in 15.B The yarns obtained in 15.B are then drawn by uptake on a specific drawing rig between two rolls, the temperature of the yarn before drawing being controlled by the temperature of the first roll. The temperature of the second roll is 25° C.

The drawing can be carried out within a wide temperature range, between 77° C. and 155° C.

Table VI below gives the operating conditions associated with the various drawn yarns. For each type of non-drawn yarn, the temperature T (°C.) at which the drawing is set and the drawing rate effectively applied (ratio: speed of second roll/speed of first roll) are indicated:

TABLE VI

| Non-drawn yarn | T (° C.) | λ | Reference |
|---|---|---|---|
| Test 15.1 | 77 | 4.23 | 8.11 |
| Test 15.1 | " | 4.76 | 8.12 |
| Test 15.1 | 103 | 4.49 | 8.13 |
| Test 15.1 | " | 5.08 | 8.14 |
| Test 15.1 | 116 | 3.93 | 8.15 |
| Test 15.1 | " | 4.41 | 8.16 |
| Test 15.2 | 131 | 4.93 | 8.21 |
| Test 15.2 | 143 | 4.56 | 8.22 |
| Test 15.2 | " | 4.75 | 8.23 |
| Test 15.3 | 77 | 4.06 | 8.31 |
| Test 15.3 | " | 4.38 | 8.32 |
| Test 15.3 | 116 | 4.96 | 8.33 |
| Test 15.3 | 143 | 4.85 | 8.34 |
| Test 15.3 | " | 5.14 | 8.35 |
| Test 15.3 | 155 | 3.70 | 8.36 |
| Test 15.3 | " | 4.00 | 8.37 |
| Test 15.4 | 77 | 4.56 | 8.40 |
| Test 15.4 | " | 4.91 | 8.41 |
| Test 15.4 | 116 | 4.71 | 8.42 |
| Test 15.4 | " | 5.06 | 8.43 |
| Test 15.4 | 145 | 4.38 | 8.44 |
| Test 15.4 | " | 4.78 | 8.45 |
| Test 15.4 | " | 5.21 | 8.46 |
| Test 15.4 | 155 | 4.37 | 8.47 |
| Test 15.4 | " | 4.72 | 8.48 |
| Test 15.4 | " | 4.99 | 8.49 |
| Test 15.5 | 117 | 4.08 | 8.51 |
| Test 15.5 | " | 4.42 | 8.52 |
| Test 15.5 | " | 4.72 | 8.53 |
| Test 15.5 | 143 | 3.79 | 8.54 |
| Test 15.5 | " | 4.17 | 8.55 |
| Test 15.5 | " | 4.54 | 8.56 |

TABLE VI-continued

| Non-drawn yarn | T (° C.) | λ | Reference |
|---|---|---|---|
| Test 15.6 | 117 | 4.39 | 8.61 |
| Test 15.6 | " | 4.75 | 8.62 |
| Test 15.6 | " | 4.92 | 8.63 |
| Test 15.6 | 143 | 4.25 | 8.64 |
| Test 15.6 | " | 4.62 | 8.65 |
| Test 15.6 | " | 4.94 | 8.66 |

After drawing, monofilaments of diameter 100 to 120 μ/m depending on the value of the drawing rate applied are obtained.

No particular difference is noted in terms of the drawability between the comparative compositions of tests 15.1 and 15.2 (PA-6) and those of the present invention containing a fraction of 2 or 5% of hyperbranched polyamide.

In particular, the maximum accessible drawing rates remain comparable (between 5.2 and 5.9 depending on the temperatures).

Similarly, comparable drawing rates can be applied to these different compositions: 3.7 to 5.2 depending on the final desired elongation at break.

15.D Characterization of These Drawn Yarns

These drawn yarns are then characterized in terms of mechanical properties on a standard tensile testing machine of Erichsen brand.

The measurement conditions are thus:

initial length of the test sample between the jaws=50 mm, pneumatic jaws, speed of travel of the jaws=50 mm/min, measurement in a climatized room at 23° C. and 50% RH with preconditioning of the drawn yarns for 48 h before analysis, measurement of the breaking stress by dividing the breaking force (N) by the initial cross section (mm$^2$), measurement of secant modulus at 5% elongation, average of the data on 6 to 12 test samples.

TABLE VII

| | of results: | | |
|---|---|---|---|
| Drawn yarn | $\sigma_r$ (MPa) | $\epsilon_r$ (%) | E (GPa) |
| 15.11 | 845 | 16.9 | 3.877 |
| 15.12 | 761 | 20.0 | 3.859 |
| 15.13 | 695 | 22.5 | 3.373 |
| 15.14 | 936 | 19.5 | 4.267 |
| 15.15 | 578 | 28.8 | 2.844 |
| 15.16 | 535 | 31.8 | 2.518 |
| 15.21 | 804 | 20.3 | 3.752 |
| 15.22 | 607 | 30.6 | 2.841 |
| 15.23 | 867 | 21.7 | 3.881 |
| 15.31 | 521 | 33.5 | 3.021 |
| 15.32 | 592 | 23.8 | 3.411 |
| 15.33 | 768 | 22.1 | 3.680 |
| 15.34 | 660 | 24.3 | 3.478 |
| 15.35 | 733 | 20.7 | 3.783 |
| 15.36 | 502 | 34.2 | 3.421 |
| 15.37 | 596 | 26.6 | 3.838 |
| 15.40 | 612 | 32.1 | 3.149 |
| 15.41 | 679 | 25.9 | 3.167 |
| 15.42 | 725 | 30.1 | 3.685 |
| 15.43 | 800 | 23.8 | 3.942 |
| 15.44 | 617 | 33.7 | 3.668 |
| 15.45 | 692 | 27.0 | 4.015 |
| 15.46 | 872 | 19.2 | 4.519 |
| 15.47 | 645 | 24.7 | 4.180 |
| 15.48 | 651 | 26.7 | 3.897 |
| 15.49 | 820 | 21.5 | 4.773 |

TABLE VII-continued

| | of results: | | |
|---|---|---|---|
| Drawn yarn | $\sigma_r$ (MPa) | $\epsilon_r$ (%) | E (GPa) |
| 15.51 | 557 | 27.6 | 4.358 |
| 15.52 | 614 | 24.9 | 4.568 |
| 15.53 | 740 | 22.7 | 5.447 |
| 15.54 | 507 | 24.6 | 4.417 |
| 15.55 | 510 | 33.8 | 4.029 |
| 15.56 | 660 | 22.4 | 5.189 |
| 15.61 | 654 | 29.1 | 4.956 |
| 15.62 | 586 | 26.5 | 4.488 |
| 15.63 | 808 | 22.0 | 5.647 |
| 15.64 | 552 | 34.2 | 4.228 |
| 15.65 | 749 | 23.8 | 5.562 |
| 15.66 | 907 | 24.9 | 6.439 |

$\sigma_r$: breaking stress force
$\epsilon_r$: elongation at break
E: modulus

Figure 2:
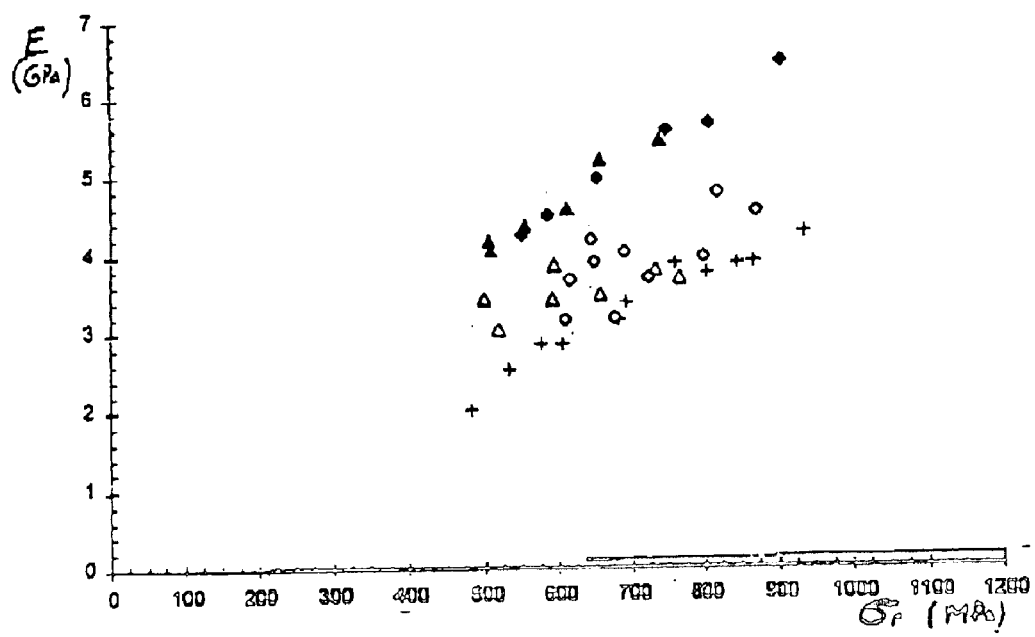
Figure 3:
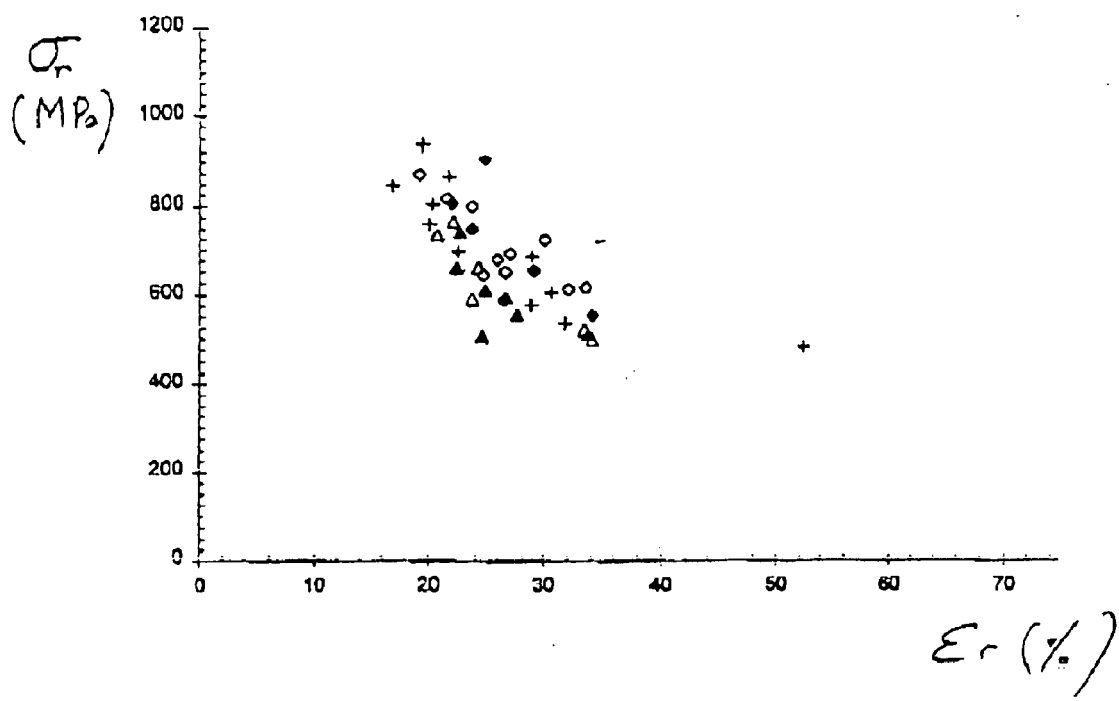
Figure 4:
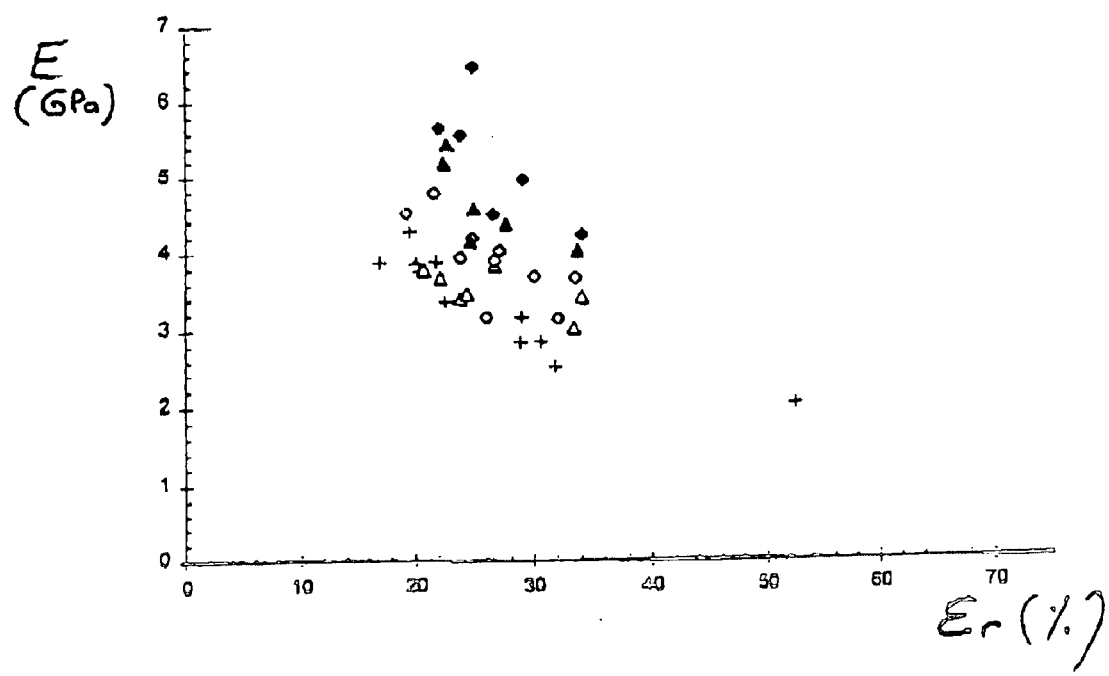

The corresponding data have also been reported in the three attached FIGS. 2, 3 and 4:

FIG. 2: modulus as a function of the breaking stress E=f($\sigma_r$),

FIG. 3: breaking stress as a function of the elongation at break ($\sigma_r$)=f($\epsilon_r$), FIG. 4: modulus as a function of the elongation at break E=f($\epsilon_r$)

The key to these figures is as follows:

\+ pure PA-6 (tests 8.11 to 8.16 and 8.21 to 8.23)

Δ PA-6 with 2% of HBPA-COOH (tests 8.31 to 8.37)

◇ PA-6 with 2% of HBPA-NH$_2$ (tests 8.40 to 8.49)

☐ PA-6 with 5% of HBPA-COOH (tests 8.51 to 8.56)

◆ PA-6 with 5% of HBPA-NH$_2$ (tests 8.61 to 8.66)

HBPA=hyperbranched polyamide with a ratio 1/1=(I)/(II)

The striking feature of the products obtained in the context of this invention is that they make it possible to generate compromises different from those accessible with PA-6 alone.

From the curves in FIGS. 2 to 4, the results show that the compromise between the elongation at break and the breaking stress force is different for the compositions in accordance with the invention containing a hyperbranched polyamide with nylon-6.

Thus, it appears clearly that the stress/elongation at break compromise can be conserved while at the same time significantly increasing the modulus value.

Example 16

A composition comprising 98 parts by weight of nylon-6 and 2 parts by weight of a hyperbranched copolyamide (PAMB) according to Example 4 is produced using a twin-screw extruder. The composition (PA-6+PAMB) is formed into granules on leaving the extruder.

The granules are immersed in a dyeing bath having the following characteristics:

dye: 150% Rawl polar blue concentration: 1% ratio of the bath: 1/50 pH 6.

The temperature of the bath is raised to 98° C. at a rate of 1° per minute and then the bath is held at 98° C. for 30 minutes. The temperature of the bath is then lowered at a rate of 2° per minute.

A similar experiment is carried out for a nylon-6 (PA-6) not containing the hyperbranched copolyamide.

The dye loss of the bath is measured by calorimetric assay of the both before and after dyeing.

The concentration of amine terminal groups in the granules is also measured before dyeing. The results are given in Table VIII.

TABLE VIII

|  | PA-6 + PAHB | PA-6 |
| --- | --- | --- |
| Amine terminal groups | 126 mg/kg | 42 mg/kg |
| Dye loss | 95% | 44% |

What is claimed is:

1. Hyperbranched copolyamide obtainable by reaction between:

at least one monomer of formula (I) below:

$$A—R—B_f \quad (I)$$

in which A is a polymerization-reactive functional group, B is a polymerization-reactive functional group capable of reacting with A, R is a carbon-containing species which optionally includes heteroatoms and f is the total number of reactive functions B per monomer: $f \geq 2$;

and at least one difunctional monomer of formula (II) below:

(II) A'—R'—B' or the corresponding lactams, in which A', B' and R' have the same definition as that given above for A, B and R, respectively, in formula (I); wherein the I/II molar ratio is defined as follows:

$$0.05 < I/II;$$

and in that at least one of the species R or R' of at least one of the monomers (I) or (II) is aliphatic, cycloaliphatic or arylaliphatic.

2. Hyperbranched copolyamide according to claim 1, wherein:

the species R and R' of the monomers (I) and (II) respectively each comprise:

i at least one linear or branched aliphatic radical;

ii and/or at least one cycloaliphatic radical;

iii and/or at least one aromatic radical comprising one or more aromatic rings;

iv and/or at least one arylaliphatic radical; these radicals (i), (ii), (iii) and (iv) optionally including heteroatoms;

and in that:

A or A' is a reactive functional group of the amine or amine salt or of acid, ester, acid halide or amide;

B or B' is a reactive functional group of acid, ester, acid halide or amide or of the amine or amine salt.

3. Hyperbranched copolyamide according to claim 1, wherein at least some of the difunctional monomers (II) are in prepolymer form.

4. Hyperbranched copolyamide according to claim 3, wherein the polymerization-reactive functional groups A, B, A' and B' are selected from the group consisting of carboxylic and amine.

5. Hyperbranched copolyamide according to claim 1, which further comprises "core" monomers of formula (III):

$$R^1(B'')_n \quad (III)$$

in which:

$R^1$ is a substituted or unsubstituted radical which can comprise unsaturations and/or heteroatoms;

B" is a reactive functional group of the same nature as B or B';

$-n \geq 1$.

6. Hyperbranched copolyamide according to claim 1, which further comprises "chain-limiting" monomers of formula (IV):

$$R^2—A'' \quad (IV)$$

in which:

$R^2$ is a substituted or unsubstituted radical which can comprise one or more unsaturations and/or one or more heteroatoms;

and A" is a reactive functional group of the same nature as A or A'.

7. Hyperbranched copolyamide according to claim 1, wherein the monomer of formula (I) is a compound in which A represents an amine functional group, B represents a carboxylic functional group R represents an aromatic radical and f=2.

8. Hyperbranched copolyamide according to claim 7, wherein the monomer (I) is selected from the group consisting of:

5-aminoisophthalic acid, 6-aminoundecanedioic acid, 3-aminopimelic diacid, aspartic acid, 3,5-diaminobenzoic acid, 3,4-diaminobenzoic acid, lysine, and mixtures thereof.

9. Hyperbranched copolyamide according to claim 1, wherein the difunctional monomer of formula (II) is:

ε-caprolactam and/or the corresponding amino acid: aminocaproic acid, and/or para- or meta-aminobenzoic acid, and/or 11-aminoundecanoic acid, and/or lauryllactam and/or the corresponding amino, acid: 12-aminododecanoic acid.

10. Hyperbranched copolyamide according to claim 1, wherein the molar ratio of the monomers (IV) to the difunctional monomers (I) is defined as follows:

$$\frac{(IV)}{(I)} \leq 10$$

and in that the molar ratio of the "core" functional monomers (III) relative to the multifunctional monomers (I) may be defined as follows:

$$\frac{(III)}{(I)} \leq 1$$

11. Hyperbranched copolyamide according to claim 5, which is in the form of particles each comprising one or more arborescent structures, and functionalized at a focal point of the arborescent structure(s), via monomers (III) bearing at least one functional group, and/or at a periphery of the arborescent structures, via monomers (IV) bearing at least one functional group.

12. Process for preparing a hyperbranched copolyamide according to claim 1, which comprises conducting a polycondensation between at least one monomer (I) and at least one monomer (II) and optionally with monomers (III) and/or (IV); under temperature and pressure conditions; this polymerization being performed in the melt, in solution or in the solid state, the monomer (II) acting as solvent.

13. Process according to claim 12, wherein at least one polycondensation catalyst is used.

14. Compound which comprises:
a hyperbranched copolyamide according to claim 1 having terminal functional groups and having:
chemical compounds linked to at least some of the terminal groups.

15. Compound according to claim 14, wherein the chemical compounds are organic and linked to the terminal functional groups by a covalent bond.

16. Compound according to claim 15, wherein the chemical compounds are selected from the group consisting of ions, metal ions, and particles based on metals or metal oxides and are linked to the terminal functional groups by ionic or chelating interaction.

17. Process for manufacturing a compound according to claim 14, comprising treating the hyperbranched copolyamide with the chemical compound after synthesis thereof.

18. A hyperbranched copolyamide according to claim 1, which further includes functional groups differing from the amide groups, the functional groups being attached to at least one of the monomers (I), (II), (III) and (IV).

19. Process for manufacturing the copolyamide according to claim 18, comprising conducting a polycondensation between monomers (I) with themselves and with monomers (II) which also react together and optionally with monomers (III) and/or (IV), at least one of the monomers having a functional group different from the functional groups reacting to form the amide linkages.

20. Linear or branched polymers containing an effective amount of the copolyamide according to claim 1.

21. A method for modifying the thermomechanical properties of polymer materials comprising adding to said polymer materials an effective amount of the copolyamide according to claim 1.

22. A method for modifying the hydrophilicity/hydrophobicity of polymer materials comprising polyamides and/or polyesters comprising adding to said polymer materials an effective amount of the copolyamide according to claim 1.

23. A method of modifying the dyeing properties of a polymeric material comprising adding to said polymeric material an effective amount of the copolyamide according to claim 1.

24. The method according to claim 22, wherein the polyamide is nylon-6.

25. A method for stabilizing dispersions of inorganic and/or organic products comprising adding thereto an effective amount of the copolyamide according to claim 1.

26. Thermoplastic polymer composition, comprising:
a polymer matrix;
at least one additive comprising at least one hyperbranched copolyamide according to claim 1.

27. Thermoplastic polymer composition according to claim 26, wherein the additive which comprises the hyperbranched copolyamide is present in a proportion (expressed as % by dry weight relative to the total mass of the composition) of:

0.001 to 70.

28. Composition according to claim 26, wherein the matrix is based on nylon-6.

29. Dispersion or solution which comprises:
a liquid dispersion (or solubilization) medium;
at least one dispersed organic and/or inorganic product;
and at least one stabilizer comprising at least one functionalized hyperbranched polyamide according to claim 11.

30. Articles obtained from the copolyamide of claim 18.

* * * * *